Feb. 24, 1959     W. E. WALKER, JR     2,874,426
SLIP JACKET FOR FOUNDRY MOLDS
Filed Dec. 13, 1955
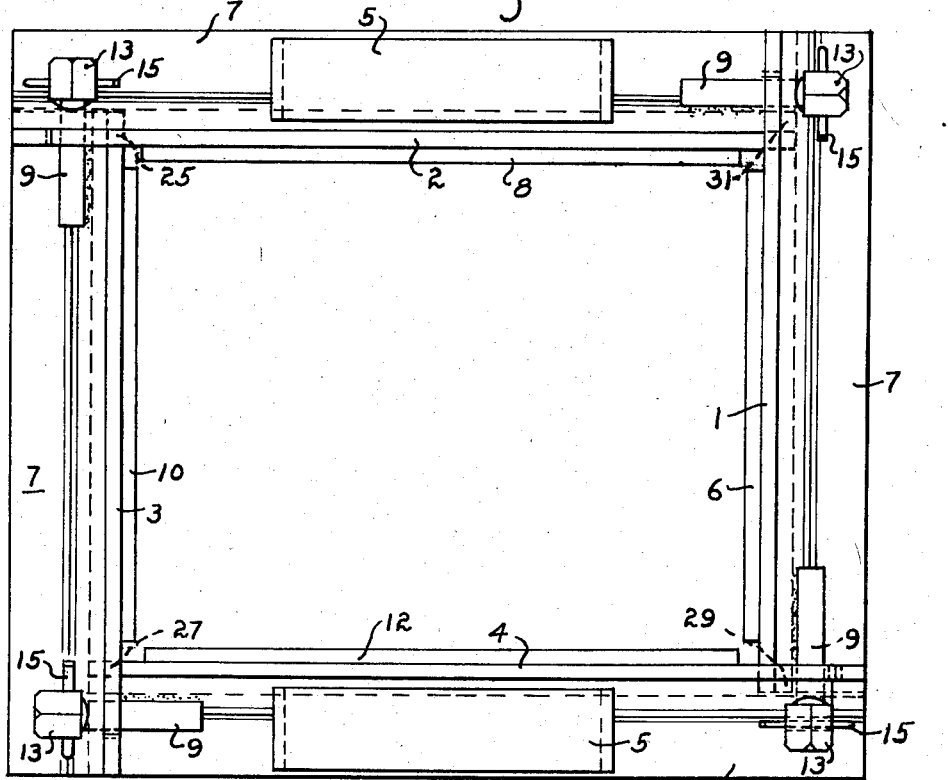
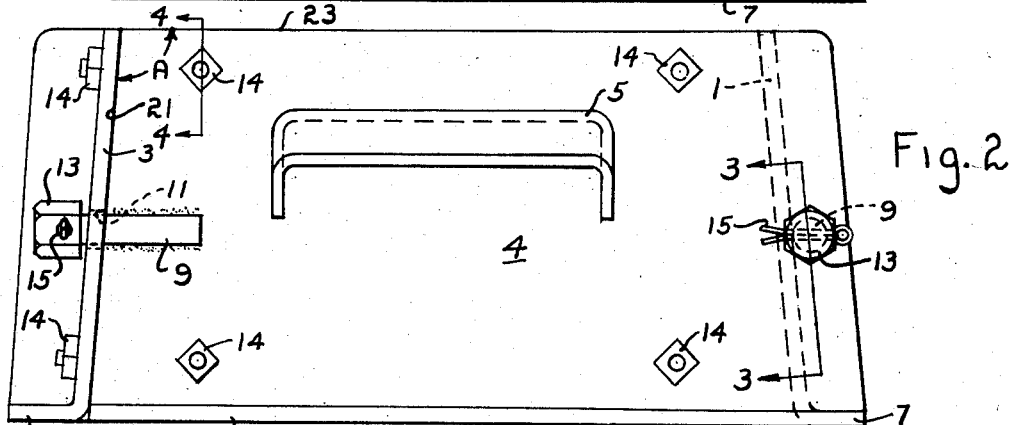
WILLIAM E. WALKER, JR.
INVENTOR.
BY Edmund W. E. Kamm
ATTORNEY

2,874,426
SLIP JACKET FOR FOUNDRY MOLDS
William Ernest Walker, Jr., Cape Girardeau, Mo.

Application December 13, 1955, Serial No. 552,831

6 Claims. (Cl. 22—112)

This invention relates to a slip jacket, more specifically, it relates to a slip jacket which is used to support sand type foundry molds after they have been removed from the flask and prior to pouring the mold.

It is an object of the invention to provide a slip jacket which in inexpensive but effective.

Another object of the invention is to provide a slip jacket the sides of which tilt to a limited degree to prevent damaging the mold as the jacket is installed.

A further object of the invention is to provide a slip jacket the walls of which tilt to a limited degree to conform to the slope of the exterior sides of the mold.

Yet another object of the invention is to provide a slip jacket having simple means for regulating the degree of tilt of the sides of the jacket.

It is a further object of the invention to provide a slip jacket, the interior surfaces of the walls of which are lined with "Transite" which has smooth surfaces and which is not adversely affected by the conditions under which it is used.

Still another object of the invention is to provide a slip jacket which has a long life.

Yet a further object of the invention is to provide a slip jacket which is easy to handle and to apply to the mold.

These and other objects of the invention will become apparent from a study of this specification and the drawings which are attached hereto, made a part hereof and in which:

Figure 1 is a plan view of my improved slip jacket.

Figure 2 is an end elevation viewed from the bottom of Figure 1.

Figure 3 is a sectional view taken substantially on the line 3—3 of Figure 2 showing the pivot or connecting means.

Figure 4 is a sectional view taken substantially on the line 4—4 of Figure 2 showing the means for mounting the "Transite" plates on the walls of the jacket.

Referring to the drawings, the numerals 1 and 3 indicate the side walls of the slip jacket while 2 and 4 indicate the end walls which may be provided with handles 5. Each of the walls is similar to the others except that one pair may be longer than the other pair if desired. The length of the walls is, of course, determined by the size of the mold on which the jacket is to be used.

The walls are preferably provided with an outwardly extending horizontal flange 7 at least at the bottom, although both bottom and top flanges may be used if desired.

Each wall has welded to the outer surface at the first end thereof, a pivot stud 9. The free end of the stud or projection is threaded and the central axis of the stud is disposed parallel to and substantially adjacent to the central longitudinal axis of the wall and extends beyond the end of the wall.

A perforation 11, having a diameter slightly greater than that of the stud, is formed in spaced relation from the second end of the wall and is also located substantially on the longitudinal axis of the wall.

The slip jacket is assembled by inserting the stud of one wall into the perforation in the adjacent wall which thus overlaps the end of the stud bearing wall and screwing a cap nut 13 on the stud. A cotter pin 15 is preferably passed through the stud and nut to prevent loosening of the nut.

It will be seen from Figure 3 that the nut is not drawn down tightly on the overlapping wall but is stopped by the stud so that, due to the clearance between the stud and hole and that between the nut and the wall, the overlapping wall may tilt and rotate on the stud. Likewise, the wall bearing the stud can rotate about the axis of the stud and tilt vertically and laterally with respect to the overlapping wall. Thus each end of each wall may move angularly relatively to an adjacent wall about an axis perpendicular or substantially perpendicular to the surface of the adjacent wall, the longitudinal axis of each wall extending in the same general direction as the perpendicular to the surface of an adjacent wall in all positions of adjustment. In this manner a limited, substantially universal action of both walls is possible.

Since each of the corners is similarly constructed, the walls of the slip jacket are free to adjust to the slopes of the outer surfaces of the mold as well as to the peripheral shape thereof.

Flat plates of material designated by numerals 6, 8, 10 and 12 are attached, by means of bolts 14 to the respective walls 1, 2, 3, and 4 respectively as shown in Figure 4. The ends of the plates are parallel to the adjacent end of the respective walls to which they are attached but terminate short of said ends.

Referring to Figure 1, it will be seen that the upper end of plate 6 is overlapped by the right hand end of wall 2 but not by plate 8 while the left hand end of plate 8 is overlapped by the upper end of wall 3 but not by plate 10 etc.

The overlapped end of each plate is spaced somewhat from the surface of the plate which overlaps it when these elements are parallel. Thus each wall may be rotated about its stud until it strikes the end of the overlapped plate. Thus the walls may rotate about, move endwise and/or radially on their respective studs to a limited degree so that while the plates may adjust to the shape of the mold to which the jacket is applied, the jacket will not twist and turn entirely out of shape and thus become unmanageable when the jacket is picked up either by its handles or by its walls.

The material forming the plates is preferably a hard pressed board made of asbestos and Portland cement which is known as "Transite." Aluminum or other suitable material may be used, depending upon the service to which the jacket is to be put.

As shown in Figure 2, the overlapped ends of the walls and plates are not cut square with respect to the top and bottom edges but are cut at an angle A with respect to the top edges so that the slope of the ends approximates the slopes of the walls of the mold. The universal movement of the walls then permits exact adjustment of the walls of the jacket to the walls of the mold. This is accomplished automatically as the jacket is applied to the mold. The plates thus support substantially the entire surface of the mold against displacement when the metal is poured into it. Should the mold be out of square, the jacket will adjust to this conformation also.

While I have disclosed herein, for purposes of illustration, a preferred form of my invention, it is obvious that various changes may be made in structure, design, form and arrangement of the parts without departing from the spirit of the invention. I do not, therefore, wish to be limited to the specific form disclosed but desire protection falling fairly within the scope of the appended claims.

I claim:

1. A slip jacket for foundry molds comprising a number of walls each of which includes a first end and a second end, said second end defining an opening, said walls being arranged to form an enclosure with the second end of each wall disposed in overlapping relation with the first end of the next adjacent wall, a projection integral with the first end of each wall and extending therebeyond through the opening in the overlapping second end, means on said projection disposed beyond said second end for limiting the movement of the second end on said projection away from said overlapped first end and a plate of lining material fixed to the inner surface of each wall for contact with the material of a mold, each plate having one end disposed in spaced, overlapped relation with respect to the first end of one of the adjacent walls to limit rotation of the walls through contact between the plates and said first ends of said walls as the jacket is manipulated.

2. A slip jacket for foundry molds comprising a number of walls each of which includes a first end and a second end, said second end defining an opening, said walls being arranged to form an enclosure, with the second end of each wall disposed in overlapping relation with the first end of the next adjacent wall, a projection integral with the first end of each wall and extending therebeyond through the opening in the overlapping second end, a plate of Transite lining material fixed to the inner surface of each of said walls for contact with the material of the mold, the ends of the plates terminating short of the ends of the walls to which they are fixed and the end of each plate adjacent the second end of the wall to which it is fixed being overlapped by and spaced from the first end of the next adjacent wall to limit the rotation of the latter wall about its projection.

3. A slip jacket for foundry molds comprising a number of walls each of which includes a first end and a second end, said second end defining an opening, said walls being arranged to form an enclosure with the second end of each wall disposed in overlapping relation with the first end of the next adjacent wall, a projection integral with the first end of each wall and extending therebeyond through the opening in the overlapping second end, means on the projection disposed beyond said second end for limiting the movement of the second away from the overlapped first end and means comprising plates mounted on the interior surfaces of said walls, said plates having their corresponding ends overlapped by the first ends of the adjacent walls for limiting the rotation of said adjacent walls on their respective projections.

4. A slip jacket for foundry molds comprising a number of walls having a longitudinal axis, each wall including a first and second end, said second end defining an opening disposed substantially on said axis, said walls being arranged to form an enclosure with the second end of each wall disposed in overlapping relation with the first end of the next adjacent wall, a stud disposed substantially along the axis of, and extending beyond the first end of each wall and extending through the opening in the overlapping second end, a cap fixed to the end of said stud and spaced from said first end a distance greater than the thickness of the adjacent second end, said stud being of less diameter than the associated opening whereby said respective ends may move universally with respect to each other and stop means comprising plates fixed to the interior surfaces of the walls, the ends of the plates adjacent the second ends of the walls to which the plates are fixed being overlapped by but disposed in predetermined spaced relation with respect to the first ends of the adjacent walls for limiting the rotation of each wall about its attached stud.

5. A slip jacket for foundry molds comprising a plurality of walls formed with interior surfaces and having adjacent ends interconnected to form an enclosure, a plate secured to the interior surface of each of said walls, means connecting the first end of each wall to the second end of an adjacent wall with said second end of one wall extending beyond and overlapping the said first end of the other wall, said means being formed to provide relative angular movement of said other wall about an axis substantially perpendicular to the said interior surface of said one wall, and limited angular movement of said one wall about an axis substantially perpendicular to the interior surface of said other wall, each of said plates having its end adjacent the second end of its respective wall disposed to limit the relative angular movement of said other wall with respect to said one wall.

6. A slip jacket for foundry molds comprising a plurality of walls formed with interior surfaces and having adjacent ends interconnected to form an enclosure, a plate secured to the interior surface of each of said walls, means connecting the first end of each wall to the second end of an adjacent wall with said second end of one wall extending beyond and overlapping the said first end of the other wall, said means being formed to provide relative angular movement of said other wall about an axis substantially perpendicular to the said interior surface of said one wall, and limited angular movement of said one wall about an axis substantially perpendicular to the interior surface of said other wall, the angular movement of said one wall being limited by engagement of the one wall with the end of said other wall, each of said plates having its end adjacent the second end of its respective wall disposed to limit the relative angular movement of said other wall with respect to said one wall.

References Cited in the file of this patent

UNITED STATES PATENTS

| | | |
|---|---|---|
| 1,271,752 | Nute | July 9, 1918 |
| 2,050,778 | Bester | Aug. 11, 1936 |
| 2,272,707 | Hines | Feb. 10, 1942 |
| 2,473,140 | Erlbacher | June 14, 1949 |
| 2,507,158 | Hines | May 9, 1950 |